(12) United States Patent
Dworkin

(10) Patent No.: US 11,011,060 B1
(45) Date of Patent: May 18, 2021

(54) SYSTEM FOR PROTECTING VEHICLES FROM DAMAGE IN A CONFINED SPACE

(71) Applicant: DRDesigns, LLC, Incline Village, NV (US)

(72) Inventor: Darryl R. Dworkin, Incline Village, NV (US)

(73) Assignee: DRDesigns, LLC, Incline Village, NV (US)

( * ) Notice: Subject to any disclaimer, the term of this patent is extended or adjusted under 35 U.S.C. 154(b) by 0 days.

(21) Appl. No.: 17/100,546

(22) Filed: Nov. 20, 2020

Related U.S. Application Data

(60) Provisional application No. 62/947,693, filed on Dec. 13, 2019.

(51) Int. Cl.
*B60Q 1/48* (2006.01)
*G08G 1/16* (2006.01)

(52) U.S. Cl.
CPC ...................... *G08G 1/16* (2013.01)

(58) Field of Classification Search
None
See application file for complete search history.

(56) References Cited

U.S. PATENT DOCUMENTS

| | | | | |
|---|---|---|---|---|
| 4,665,378 A * | 5/1987 | Heckethorn | ............. | G08G 1/14 250/491.1 |
| 4,808,997 A * | 2/1989 | Barkley | ................... | G08G 1/04 250/491.1 |
| 5,208,586 A * | 5/1993 | Friberg | ..................... | B60Q 1/48 340/932.2 |
| 5,623,259 A * | 4/1997 | Giangardella | ........... | B60Q 1/48 340/435 |
| 10,703,411 B2 * | 7/2020 | Ho | ........................ | B62D 15/028 |
| 10,846,956 B2 * | 11/2020 | Cate | ................... | G07C 9/00896 |

* cited by examiner

*Primary Examiner* — John F Mortell
(74) *Attorney, Agent, or Firm* — Jeffrey G. Sheldon; Katherine B. Sales; Cislo & Thomas LLP

(57) ABSTRACT

A system is provided for alerting of potential vehicle damage when moving into or out of a confined space, the confined space having a side structure which can damage the vehicle when moving into the confined space if the vehicle is too close to the side structure. The system comprises a beam transmitter for transmitting a beam, and a beam receiver for receiving the beam. The beam travels along a path at an angle relative to a ground surface of from about 40 degrees to 60 degrees. An alert generator generates an alert such as light, sound, or both, when a vehicle intersects the beam.

9 Claims, 3 Drawing Sheets

SYSTEM FOR PROTECTING VEHICLES FROM DAMAGE IN A CONFINED SPACE

CROSS REFERENCE

This application claims the benefit of U.S. Provisional Application Ser. No. 62/947,693 filed on Dec. 13, 2019, which is incorporated herein by reference in its entirety. To the extent there are differences in the application and the provisional application, this application controls.

BACKGROUND

When vehicles are moved into a confined space, damage to one or more sides of the vehicle can occur. For example, a side mirror can be damaged or knocked off the vehicle by a garage wall or garage door track, or a fender can be damaged. The mirror can be costly to replace.

SUMMARY

The present invention is directed to a system to avoid such damage to a vehicle, and in particular is directed to a system for alerting likely vehicle damage when moving into or out of a confined space.

In particular, a system is provided for alerting of potential damage to a vehicle when moving the vehicle into or out of a confined space, the confined space having a door, a ground surface on which the vehicle is moved, and a side structure which can damage the vehicle when moving into or out of the confined space if the vehicle is too close to the side structure. The system comprises a first beam transmitter for transmitting a first beam and a beam receiver for receiving the first beam. The first beam transmitter and the receiver are mounted proximate to the side structure. The transmitter and receiver are mounted at different elevations relative to the ground surface, preferably with the first beam transmitter being closer to the ground surface than the receiver so that the first beam travels along a path at an angle relative to the ground surface of from about 40 degrees to 60 degrees. An alert generator that generates an alert when the vehicle intersects the beam.

Optimally a second beam transmitter transmits a second beam laterally and generally parallel to the ground surface, wherein interruption of the second beam prevents the door from closing.

DRAWINGS

Figure 1:
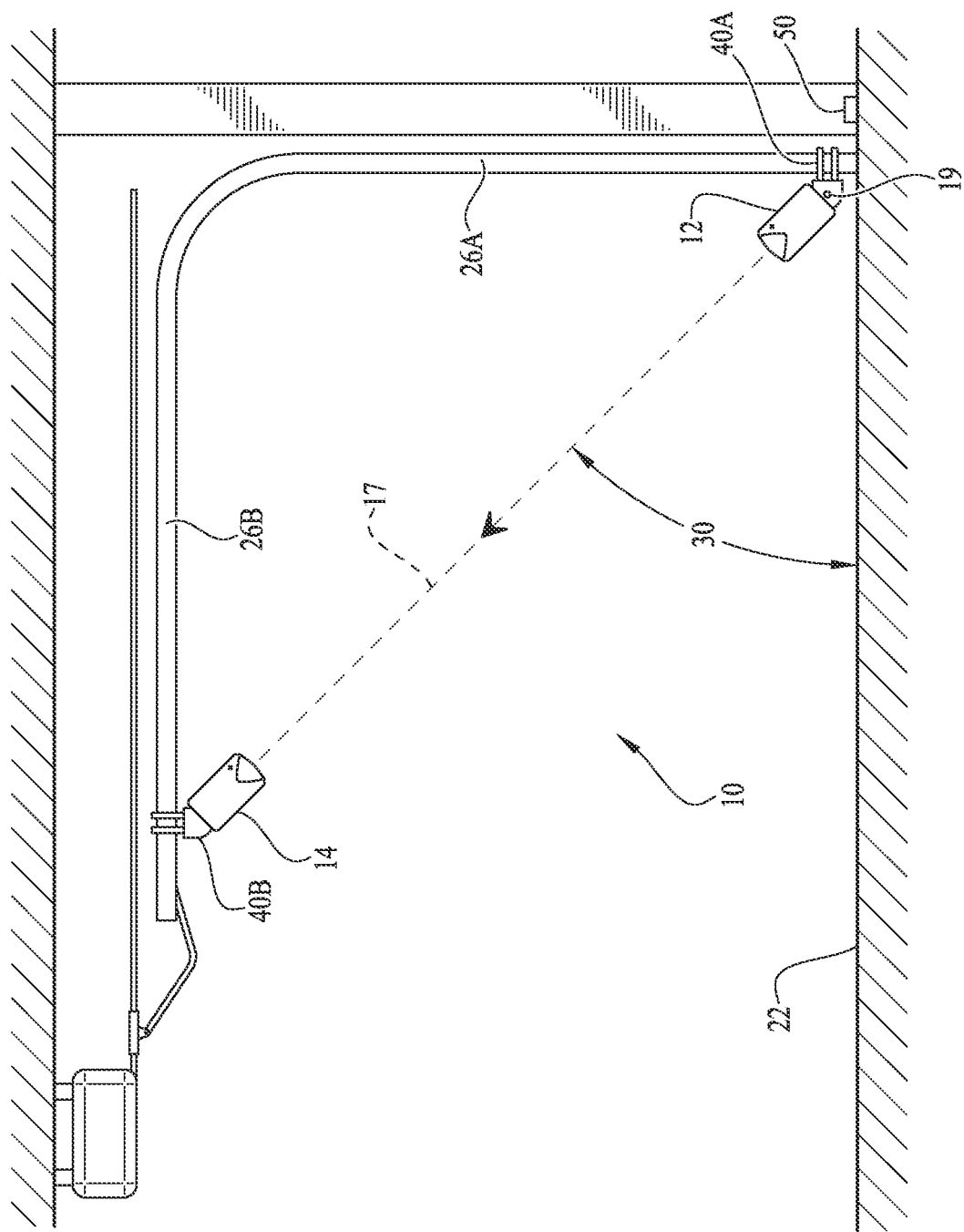
Figure 2:
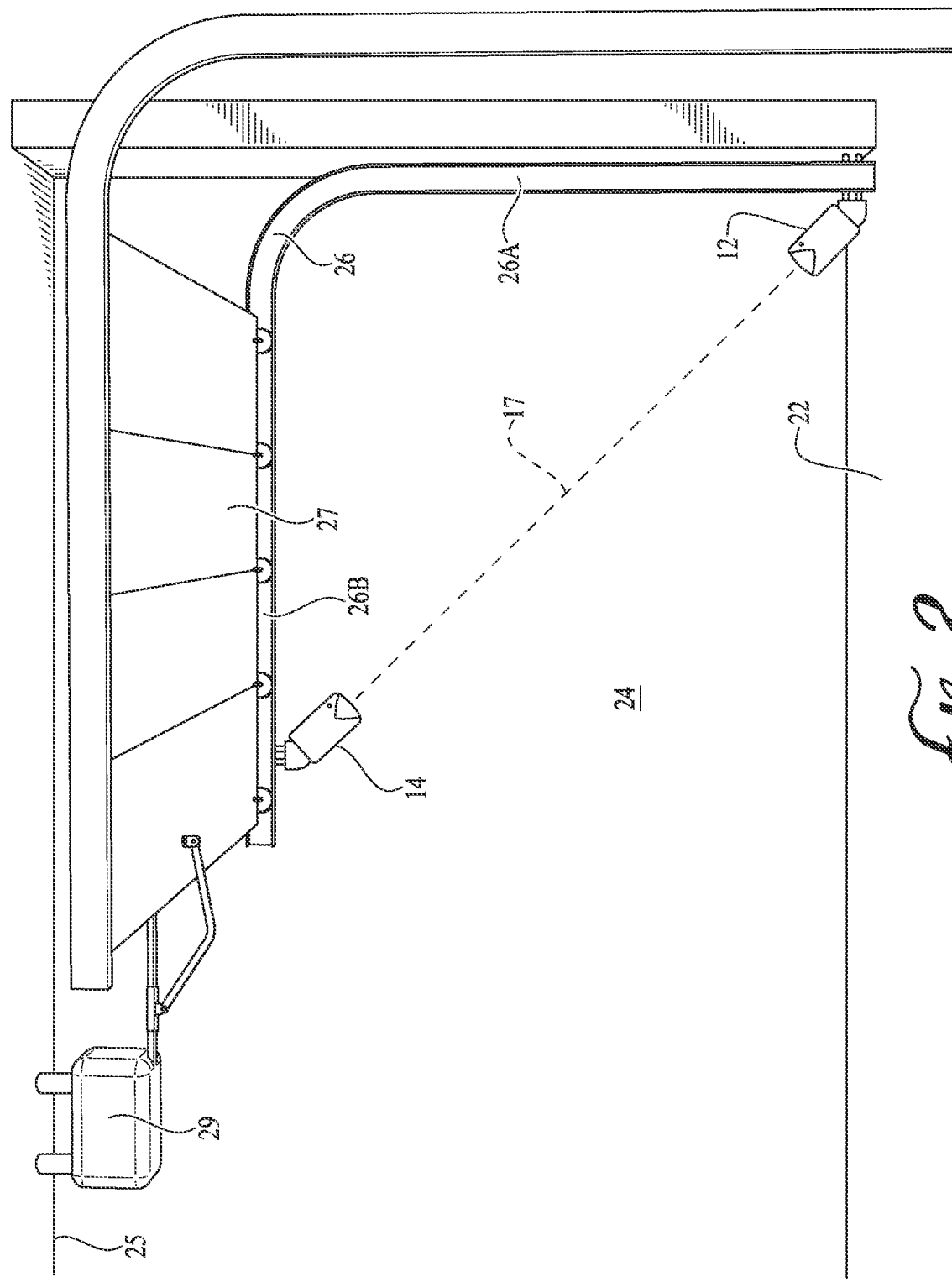

These and other features of the present invention will be better understood with regard to the following description and claims, the drawings where:

FIG. 1 is a schematic drawing showing a system having features of the present invention;

FIG. 2 demonstrates a system according to the present invention; and

Figure 3:
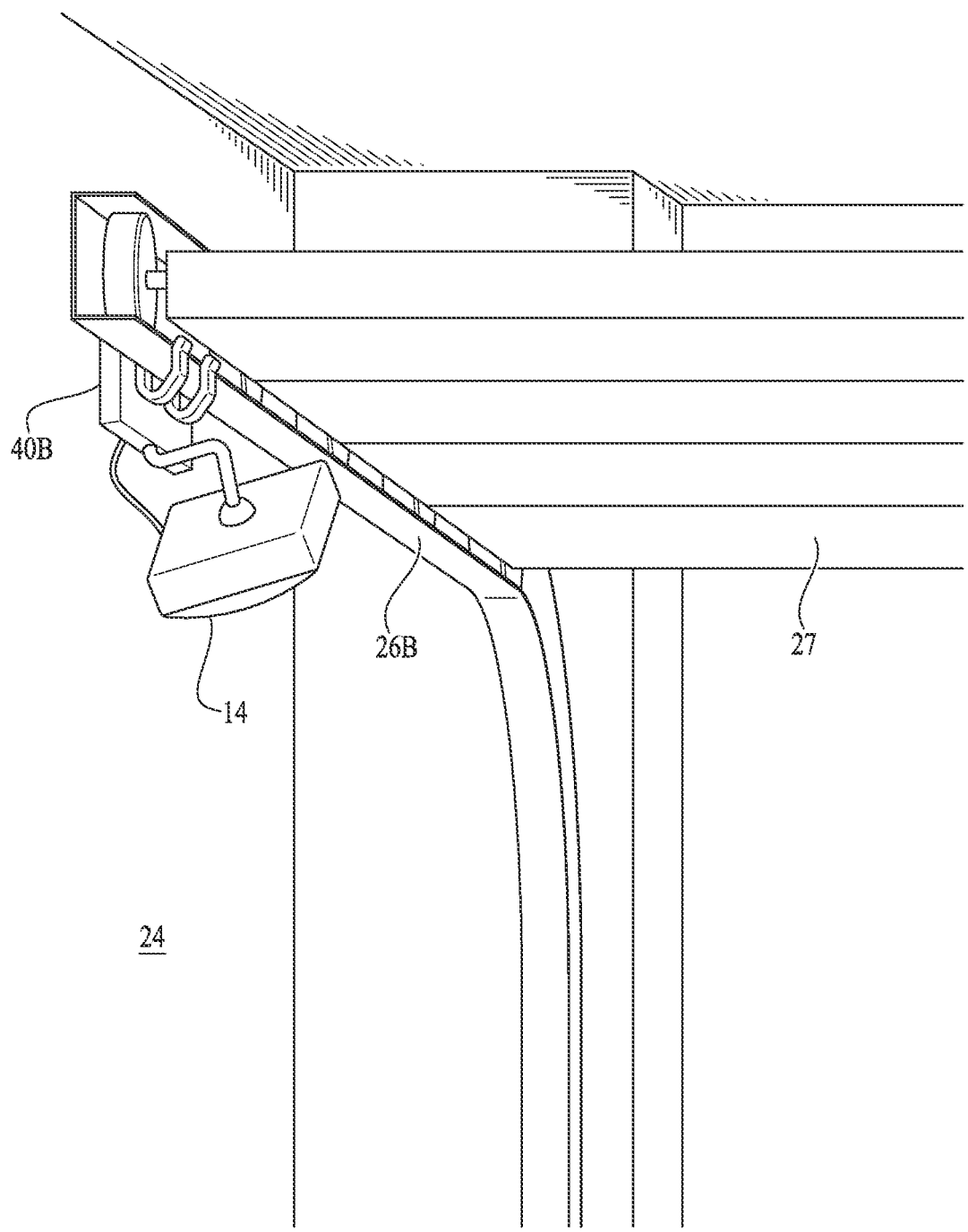

FIG. 3 is a close-up view of a receiver of the system of FIG. 2.

DESCRIPTION

With regard to the figures, a system 10 according to the present invention comprises a beam transmitter 12 and a beam receiver 14 with the transmitter sending a beam 17 toward the receiver 14. The positions of the transmitter 12 and the receiver 14 can be reversed. When reversed, the beam 17 is projected downwardly instead of upwardly.

The transmitter 12 and receiver 14 can be of the type commonly used as a safety feature for garage doors where when the garage door is coming down, if the beam, a safety beam, is interrupted, the garage door does not close, Generally, the system includes a conventional safety transmitter 19 and safety receiver (not shown) for preventing the garage door from closing when a safety beam, referred to as a second beam where beam 17 is referred to as a first beam, is interrupted.

In the version of the invention shown in the figures, the system 10 is being used in a garage serving as a confined space with a ground surface or floor 22, a side wall 24, a ceiling 25, a track 26 along which the garage door moves when opening and closing, and a vertically closing door 27. The track includes a substantially vertical track section 26A generally perpendicular to the plane of the ground surface 22 and a substantially horizontal track section 26B generally parallel to the plane of the ground surface 22, generally the floor of the garage and below the ceiling 25 of the garage. A garage door opener 29 is mounted to the ceiling 25 for powering the garage door 27 open and closed.

Generally, the beam transmitter 12 and receiver 14 are mounted at different elevations relative to the ground surface with the first beam transmitter 12 being closer to the ground surface than the receiver 14. However, the positions can be reversed with the receiver 14 closer to the ground surface than the first beam transmitter 12.

The beam 17 projects or travels at an angle 30 (see FIG. 1) from about 20 to about 70 degrees, preferably about 40 to about 60 degrees, and most preferably about 45 degrees, relative to the plane of the ground surface 22. For example, in a version of the invention where the transmitter and receiver are on the garage door track about 6 feet from the bend in the track where the track transitions from a vertical to a horizontal position, it was found 45 degrees is desirable. It is important feature of the present invention that the beam 17 is at such an angle 30 to accommodate vehicles having side mirrors at different heights such that the side mirror of a vehicle can interrupt the beam for both small and large vehicles of different height. The beam is interrupted when the vehicle is too close to a side structure such that damage can occur to the vehicle such as a side mirror being damaged.

In use, when the beam 17 is interrupted such as by a side mirror of the vehicle, there is an indication such as an alert that the vehicle is too close to a side structure and damage can result. The alert can be a sound, or a visual alert, such as a light that comes steadily on or a blinking light, or a combination of both sound and a visible alert. A blinking light is preferred. An advantage of having both a sound alert and a visual alert is the system is usable by those hard of hearing such as a deaf person. An alert generator can be incorporated into the apparatus described in U.S. Pat. No. 9,141,099.

The system 10 is particularly useful for a single vehicle garage where it can be used for both side walls, requiring a transmitter and a receiver on the right side of the vehicle and a transmitter and receiver on the left side of the vehicle.

The transmitter and receiver preferably are supported by brackets 40A and 40B, respectively, that are mounted to the garage door track 26 in such a way that do not interfere with the garage door going up and down along the track 26, and extend inwardly from the side structure of the garage. A suitable bracket 40A for the transmitter is described in U.S. Pat. No. 5,934,019. The bracket 40A for the transmitter can also be used for the safety transmitter 19 for an integrated system.

An exemplary beam transmitter and receiver are available from Street Wise Security Products under SKU SWSBAC. Street Wise is located in Winterville, N.C. This particular system has a built-in chime as an audio or sound alert to alert a user that the beam has been interrupted and the vehicle is in danger of being damaged.

The transmitter and receiver can be powered by external power such as being plugged into an outlet, or can have rechargeable batteries, or standard replaceable batteries for powering.

Alternately, all components other than the beam transmitter and receiver with holding track clips may be internal additions to OEM garage door openers.

It is desirable, but not necessary, that the beam be visible so a user knows that the system is operable. Optionally the receiver or the transmitter or both can have a built-in light to indicate power is on.

Preferably the transmitter and receiver are spaced from about 1-2 inches inwardly from the garage door track, and most preferably at 1.5 inches.

The transmitter and receiver can be wired so that the beam is always on, or only operates when activated by a switch. Optionally, a switch 50 can be provided that activates the receiver and transmitter when the garage door is opening. Preferably a switch used so that an alert is not inadvertently triggered. The switch can be mechanically operated such as a pressure switch. The switch turns off the receiver and transmitter when the garage door is closed and turns the system on when the garage door is not closed such as when beginning to open. The switch can be of the type used for cabinets with interior lights when the cabinet door is opened the light comes on and when the door is closed the light goes off. The use of the switch saves on electricity and provides for not inadvertently activating the system when the garage door is down. A projection can be provided on the garage door for toggling the pressure switch, where the projection engages the switch n the off mode and releases from the pressure switch in the on mode for the transmitter and receiver.

The present invention can be provided with a garage door or garage installation (OEM), or as a retrofit system for existing garages.

Although the present invention has been described in considerable detail, other versions are possible. For example, the invention is useful with any vertical opening garage door, manual or motor operated. The invention can be integrated with a MyQ (trademark) garage door system provided by The Chamberlain Group, Inc. located in Elmhurst Ill., Therefore, the scope of the following claims should not be limited to the versions of the invention disclosed.

What is claimed is:

1. A system for alerting of potential damage to a vehicle when moving the vehicle into or out of a confined space, the confined space having a ground surface on which the vehicle is moved and a side structure which can damage the vehicle when moving into the confined space if the vehicle is too close to the side structure, the system comprising:
   a) a beam transmitter for transmitting a beam;
   b) a beam receiver for receiving the beam;
   c) wherein the transmitter and receiver are mounted proximate to the side structure, and wherein the transmitter and receiver are mounted at different elevations relative to the ground surface so that beam travels along a path at an angle relative to the ground surface of from about 40 degrees to 60 degrees; and
   d) an alert generator that generates an alert when the vehicle intersects the beam.

2. The system of claim 1 wherein the confined space is a garage.

3. The system of claim 2 wherein the garage has a garage door track and both the transmitter and receiver are mounted on the track inwardly from the side structure.

4. The system of claim 3 wherein the transmitter and receiver each are supported by a respective bracket mounted on the garage door track.

5. The system of claim 1 wherein the alert is a sound.

6. The system of claim 1 comprising a switch for turning the receiver and transmitter on and off.

7. The system of claim 1 wherein the angle is about 45 degrees.

8. A system for alerting of potential damage to a vehicle when moving the vehicle into or out of a confined space, the confined space having a door, a ground surface on which the vehicle is moved, and a side structure which can damage the vehicle when moving into the confined space if the vehicle is too close to the side structure, the system comprising:
   a) a first beam transmitter for transmitting a first beam;
   b) a beam receiver for receiving the first beam;
   c) wherein the transmitter and receiver are mounted proximate to the side structure, and wherein the transmitter and receiver are mounted at different elevations relative to the ground surface with the first beam transmitter being closer to the ground surface than the receiver so that the first beam travels along a path at an angle relative to the ground surface of from about 40 degrees to 60 degrees;
   d) an alert generator that generates an alert when the vehicle intersects the beam; and
   e) a second beam transmitter for transmitting a second beam laterally and generally parallel to the ground surface, wherein interruption of the second beam prevents the door from closing.

9. The system of claim 8 comprising a bracket supporting both the first and second beam transmitter.

* * * * *